March 5, 1940.　　　G. J. KUHRTS, JR　　　2,192,195
PORTABLE PAVING PLANT
Filed Feb. 14, 1930　　　3 Sheets-Sheet 1
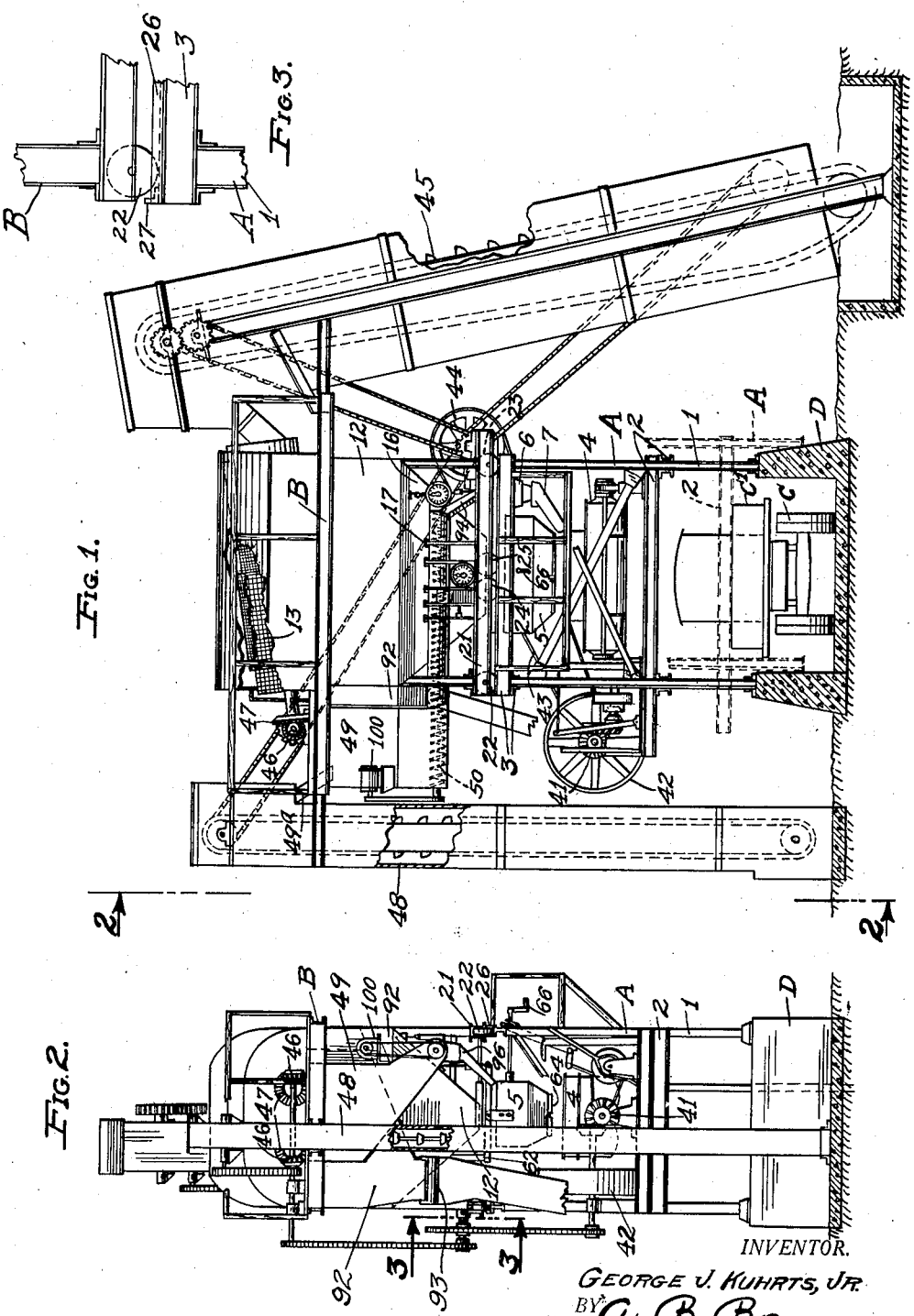
INVENTOR.
GEORGE J. KUHRTS, JR.
BY A. B. Bowman
ATTORNEY March 5, 1940.　　　G. J. KUHRTS, JR　　　2,192,195
PORTABLE PAVING PLANT
Filed Feb. 14, 1930　　　3 Sheets-Sheet 2
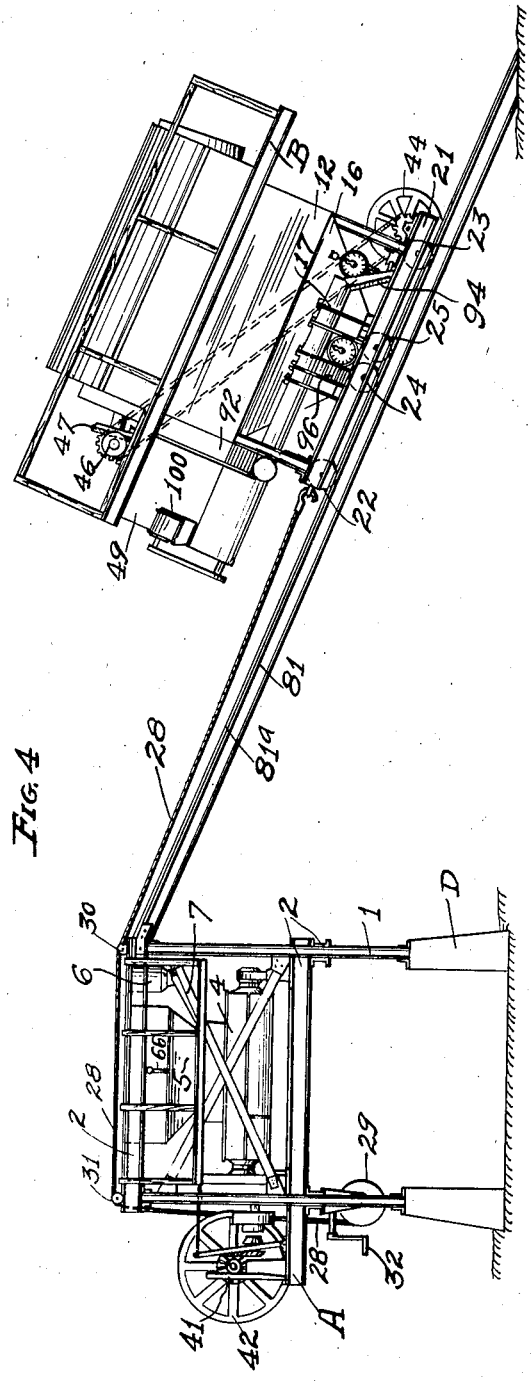
INVENTOR.
GEORGE J. KUHRTS, JR.
BY A. B. Bowman
ATTORNEY March 5, 1940.  G. J. KUHRTS, JR  2,192,195
PORTABLE PAVING PLANT
Filed Feb. 14, 1930  3 Sheets-Sheet 3
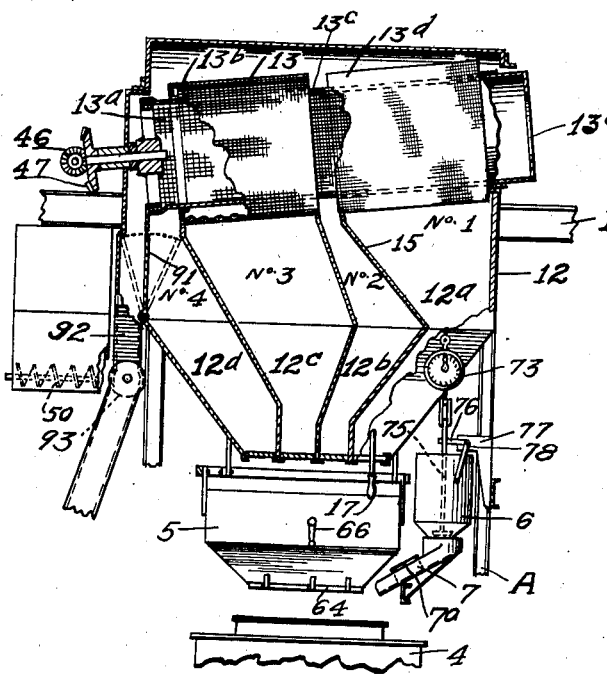
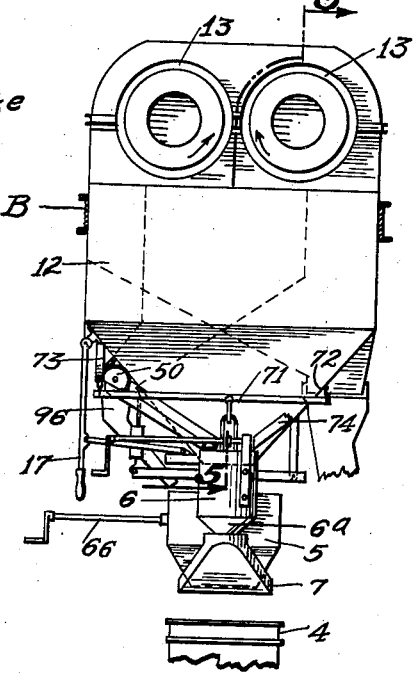
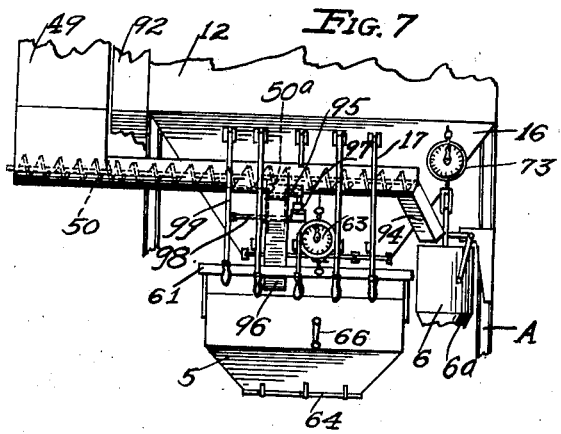
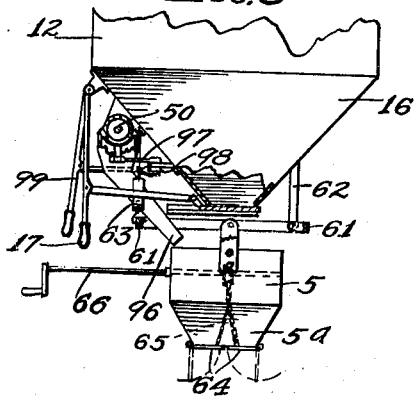
INVENTOR.
GEORGE J. KUHRTS, JR.
BY A. B. Bowman
ATTORNEY Patented Mar. 5, 1940

2,192,195

UNITED STATES PATENT OFFICE 2,192,195

PORTABLE PAVING PLANT

George J. Kuhrts, Jr., Los Angeles, Calif., assignor, by mesne assignments, to Standard Steel Corporation, Los Angeles, Calif., a corporation of California Application February 14, 1930, Serial No. 428,428

9 Claims. (Cl. 259—148)

My invention relates to portable paving plants, and the principal object of this invention is to provide improvements over the portable paving plant disclosed in United States Letters Patent No. 1,341,948 issued June 1, 1920.

The objects of my improvements are; first, to provide an efficient paving plant which may be readily conveyed from place to place in separate units and which may be readily assembled in superposed relation, or disassembled for conveyance from place to place, with a minimum of time and effort; second, to provide a paving plant of this class which, when set up, will be very rigid and will for practical purposes assume the features of a permanent plant; third, to provide novel roller or carriage means for conveying the normally upper unit in place over the lower unit; fourth, to provide a plant of this class comprising a pair of separate paving plant units adapted to be placed in superposed relation, the lower of which having a wide arch through which a motor truck, or other conveyance, may pass for receiving the mixed paving or other material from the plant and under which a flat truck may pass for receiving and mounting the lower paving plant unit thereon for conveyance from place to place; fifth, to provide a plant of this class having separate paving plant units adapted to be mounted in superposed position for co-operative relation, and in which the separate units are of very narrow construction so that each may be separately mounted or placed lengthwise on a motor truck or flatcar for conveyance from place to place; sixth, to provide a paving plant of this class of such narrow construction having a relatively long bin for receiving and storing aggregate of different kinds or size and in which the various portions of the bin may be readily controlled for discharging the desired or measured quantities of the aggregate from the various portions of the bin into a unitary weigh-box, unitary mixer, and the like; seventh, to provide a plant of this class having a long bin with various compartments from end to end and multiple screens at its upper side for screening the aggregate into various grades and discharging the grated aggregate into the designated bin or portion of the main bin; eighth, to provide a novelly constructed screen in combination with a paving plant of this class for dividing the aggregate into various sizes; ninth, to provide a relatively low and compact portable paving plant in which the weigh-box is positioned immediately below the aggregate storage bin and in which the mixer is positioned immediately below the weigh-box so that the contents of the storage bin may be discharged directly into the weigh-box where the aggregate is weighed, and in which the contents of the weigh-box are discharged directly into the mixer; tenth, to provide a compact paving plant of this class in which the asphalt weigh-bucket is positioned at one end of the aggregate weigh-box and in which the contents of the bucket are not only discharged directly into the unitary mixer but also spread over the whole width of the mixer, or over a relatively large area therein, so that a very uniform mix may be obtained in a minimum of time; eleventh, to provide a paving plant of this class in which a dust conveyer extends from one lateral side of the plant to the other and is so arranged that the material therein, such as lime dust and the like, may be conveyed into either the aggregate weigh-box or the asphalt weigh-bucket; twelfth, to provide a paving plant of this class in which the control levers for the separate aggregate bins, the discharge means for the asphalt bucket and the control means for the dust conveyer are all arranged in compact and convenient relation at one side of the plant so that all or any one may be readily controlled by a single operator on an operating platform of the plant, and in which the operating and dumping means for the mixer is also readily controlled from the same platform; thirteenth, to provide a plant of this class having a pair of cylindrical screening units arranged in parallel relation at the upper side of the paving plant, providing large capacity and accurate screening; fourteenth, to provide a paving plant of this class having a storage bin for coarse aggregate and also a discharge chute for over-size aggregate, and a gate in connection with both whereby the large and over-size aggregate may be divided and directed into respectively the bin for the large aggregate and the chute, or whereby either the large or the over-size aggregate may be directed into either the bin or the chute; and fifteenth, to provide a paving plant of the class which is simple and economical of construction proportionate to its functions, durable, efficient, easy to operate, one having large capacity, and one which will not readily deteriorate or get out of order.

With these and other objects in view, as will appear hereinafter, my invention consists of certain novel features of construction, combination and arrangement, as will be hereinafter described in detail and particularly set forth in the appended claims, reference being had to the accompanying drawings and to the characters of reference thereon which form a part of this application in which:

Figure 1 is a side elevational view of my portable paving plant in its preferred form, showing the same set up for operation, and showing a truck under the arched portion thereof for supporting the lower unit in a certain manner on the truck for conveying the same from place to place, the lowered position of the lower unit being shown fragmentarily by dotted lines, certain parts and portion of the paving plant being broken away and in section to facilitate the illustration; Fig. 2 is an end elevational view thereof taken at 2—2 of Fig. 1; Fig. 3 is an enlarged fragmentary elevational view, showing the end supporting wheels of the normally upper unit for supporting the latter upon the normally lower unit, and showing means to prevent the upper unit from rolling from its superposed relation over the lower; Fig. 4 is a side elevational view of the lower unit mounted on a foundation and the normally upper unit being drawn into place over the lower unit; Fig. 5 is an enlarged sectional elevational view of the divided main bin and the multiple screens, also showing its relation to other elements of the plant, the sectional view being taken through 5—5 of Fig. 6; Fig. 6 is an end elevational view of the structure shown in Fig. 5 and taken at a right angle thereto; Fig. 7 is an enlarged fragmentary elevational view of the main bin showing the means for controlling the discharge openings of the various portions of the bin, and also showing particularly the dust conveyer and its relation to the weigh-box and the asphalt bucket, and also showing the means for controlling the discharge from the dust conveyer to the bucket and box and Fig. 8 is another fragmentary elevational view thereof taken at a right angle thereto but showing the asphalt bucket removed and a portion of the bin and dust conveyer in section.

Like characters of reference refer to similar parts and portions throughout the views of the drawings.

My portable paving plant, as far as my present invention is concerned, consists essentially of a normally lower paving plant unit A and a normally upper paving plant unit B, which are adapted to be conveyed separately from place to place and, when assembled or set up, are superimposed for co-operative use.

The lower unit is supported on a frame which consists of a plurality, preferably four, of uprights or standards 1 which are rigidly secured relative to each other by horizontal beams 2 and 3, the former being positioned intermediate the upper and lower ends of the standards, and the latter being positioned at the upper ends thereof. On this frame, preferably immediately above the lower horizontal beams 2, is mounted a mixer 4 immediately above which is positioned a weigh-box 5 for receiving measured quantities of aggregate and for discharging the same into the mixer. Also mounted on said frame above the mixer and beyond one end of the weigh-box is a weigh-bucket 6 for receiving and weighing asphalt. The asphalt from the weigh-bucket, when discharged therefrom, is deposited into the chute 7 from which it is directed into the mixer 4 adjacent one end of the discharge opening of the weigh-box 5.

The lower ends of the standards 1 extend a considerable distance below the lower horizontal beams 2 forming an arch at the lower side or portion of the frame of the lower unit A, through which arch a truck C is adapted to pass. The contents of the mixer 4 are adapted, after being mixed, to be discharged directly into a truck or other conveyance passing underneath the mixer. The truck C, shown in Fig. 1, is a flat motor truck upon which the frame of the unit A may be lowered when the truck is positioned under the arch, as shown fragmentarily in one form and by dotted lines in Fig. 1, so that the frame of the unit A, including all elements mounted thereon, may be conveyed readily from place to place. The unit A may be blocked upwardly from the truck body by any suitable means C1 so as to raise the lower ends of the standard 1 from the ground. It will be noted that when the unit A is in position for use, the lower ends of the standards 1 are preferably supported upon and secured to suitable foundations D some distance above the level of the runway so as to reduce the height of the unit A when being conveyed from place to place on the truck.

The upper unit consists essentially of a frame 11, a multiple bin 12 and a pair of multiple screens 13. The bin 12 is of greater length than width and is positioned lengthwise with the frame 11, the width being the maximum permissible in conveying the unit from place to place on a truck or flat car. The lower frame, and the upper frame, are rectangular in plan, with the arch, referred to above, extending transversely through the wider side of the frame which I have herein referred to as the long side.

The weigh-box is suspended from a frame 61 which is pivoted at its back side on brackets 62 and suspended at its front side on a dial weighing scale 63. The weigh-box is provided at its lower side with a downwardly converging discharge portion 5a over the opening of which are gates 64. These gates 64 are pivotally mounted at the forward and rear sides of the weigh-box and are positioned in abutting relation when the opening is closed, as shown in Fig. 8. These gates are held in their closed positions by chains 65, there being one chain connected to each of the gates, said chains terminating in a unitary chain which is supported and controlled by a unitary crank 66 which extends toward the front side of the weigh-box, as shown in Figs. 5, 6, 7 and 8. When it is adapted to discharge the contents of the weigh-box, the chains 65 are simultaneously released, permitting the gates 64 to drop to the dotted line positions shown in Fig. 8, permitting the contents of the weigh-box to be discharged into the mixer.

The asphalt weigh-bucket 6 is also suspended from a support or beam 71 which is similarly mounted at its rear end on a bracket or hook 72 and at its forward end from the dial weighing scales 73 which is suspended from the main bin 12 to be hereinafter described. The asphalt weigh-bucket 6 is supplied with plastic asphalt from a suitable conductor or pipe 74. This bucket also has a downwardly converging discharge portion 6a at its lower end. In this discharge portion is positioned a valve or gate 75 having a stem 75a which extends to the upper end of the bucket and is adapted to be raised or lowered with respect to the discharge opening of the bucket by an arm 76 which is mounted on a bracket 77 supported by the frame of the plant and which arm is raised or lowered by a crank 78 also positioned at the front side of the weigh-bucket and the plant so that the contents of the weigh-bucket may be easily and quickly discharged.

The chute 7, above mentioned, extends from the discharge end of the bucket angularly toward the upper open end of the mixer 4. This chute is in the form of a spreader, the lower portion diverging toward the discharge end as shown in Fig. 6. In the bottom of the chute or spreader 7 are positioned deflector plates 7a for distributing the asphalt, discharged thereinto, more uniformly over the bottom of the spreader so that the asphalt discharged from the spreader extends substantially from side to side of the mixer into which the asphalt is discharged.

At the opposite sides and lower ends of the standards of the upper frame 11 are horizontal beams 21 on each of which are mounted four rollers or wheels, designated 22, 23, 24 and 25, the two former being mounted at the ends of the beams 21 and the two latter being positioned in close relation at the middle portion of such beams. When the two units are mounted in superposed relation, as shown in Figs. 1 and 2, the wheels rest in channels 26 which form a track at the upper side of the lower frame. The upper frame may be held in position over the lower by angle iron members 27, or other suitable means, secured to the lower frame to prevent the end wheels 22 and 23 from rolling from the track 26, as shown best in Fig. 3.

The upper unit B is raised in superposed relation over the unit A by drawing the same up an inclined track 81, consisting of a pair of spaced apart rails 81a which extend from the ground in a gradual incline to the upper end of the frame of the lower unit A and terminate and merge at such upper end at and in one end of the channels 26.

The unit B is drawn up the rails 81a by a cable 28 which is connected at one end to one end of the frame of the unit B and at the other end to a suitable drum or winch 29 mounted at the lower portion of the frame of the lower unit and at the side thereof opposite the track unit and at the side thereof opposite the track 81. At the upper portion of the frame of the lower unit are rotatably mounted sheaves 30 and 31 over which the cable 28 extends, the sheave 30 being positioned at substantially the intersection of the tracks 26 and 81 and the sheave 31 being positioned at the opposite side of the frame. The drum 29 may be rotated manually by any suitable means such as by a crank 32, or by any suitable power means, for drawing the unit B up the inclined track.

Each of the screens 13 is a rotary cylindrical screen positioned at an angle with the horizontal at the upper portion of the bin 12. The screen is made up of four separate cylindrical screens, designated 13a, 13b, 13c and 13d, all positioned in axial alinement, and all having respectively smaller meshes. The screens 13a and 13c are of the same diameter and are positioned end to end with the latter positioned above the former and adapted to direct the coarser aggregate by gravity from the latter into the former, it being noted that the aggregate is discharged into the screen member 13b through an opening 13e at the upper end of the same, as shown in Figs. 5 and 6. The screen members 13b and 13d are of considerably larger diameter than, and are positioned respectively around, the screens 13a and 13c but are shorter in length. The screen member 13d is spaced from the screen member 13b and also from the corresponding end of the screen member 13a, exposing a portion of the screen member 13c around which it is placed. The upper ends of the screen members 13a and 13b are coincident with each other but the lower end of the latter is spaced backwardly from the lower end of the former so that a portion of the lower end of the former is also exposed. Thus, when aggregate is discharged into the screen through the opening 13e, the fines will pass through the meshes of the screen member 13c into and through the meshes of the screen member 13d. That which is not discharged through the screen member 13d passes beyond and out of the lower end of the same. In like manner the next coarser grade of aggregate passes through the screen member 13b and that which passes through the screen member 13a and not through the screen member 13b passes beyond and out of the lower end of the latter. Thus four different sizes of aggregate are screened and segregated by the screen 13 and the progressively larger sizes of aggregate are discharged respectively into bins 12a, 12b, 12c and 12d in the main bin 12, the smaller bins being formed by partition walls 15 dividing the main bin 12 into a plurality of approximately smaller bins in sizes proportionate approximately to the yield of the quantity of different sizes of aggregate from the whole. At the lower ends of the bins 12a, 12b, 12c and 12d are small discharge openings which are normally covered by sliding gates 16 which are controlled from the front side of the plant by a plurality of pivoted levers 17 connected to the gates by links, as shown in Figs. 7 and 8. It will be noted that the bins 12a, 12b, 12c and 12d are positioned side by side over the length of the main bin 12. The discharge openings of each are therefore arranged in a row and all are easily controlled by the levers 17 also arranged in a row at the front side of the main bin. Thus the contents of any of the smaller bins may be easily discharged without confusion. All of the smaller bins discharge into the unitary weigh-box 5 positioned immediately thereunder.

It will be here noted that the two screens 13 are preferably identical and are positioned side by side in parallel relation to each other at opposite sides of the longitudinal axis of the storage bin, and are inclined relative thereto as described above and as shown in Figs. 5 and 6 of the drawings. By such arrangement of screens, rapid and accurate screening may be obtained to the full capacity of the several bins.

The upper portion of the outside wall of the bin 12d, opposite the partition 15 of said bin, is provided with a gate 91 which extends the whole distance across said bin and is pivoted at its lower edge. This gate extends from the pivotal axis to the lower portions of the lower end of the screens 13a and normally forms the upper portions of the outer wall of the bin 12d so that the coarse aggregate which passes thru the screen member 13a, but does not pass thru the screen 13b, passes normally into the bin 12d. This gate 91 is adapted to be shifted to the left or to the right, as shown by dotted lines in Fig. 5, so that when the gate is shifted to the left position, the over-size aggregate which does not pass through the screen member 13a but which is discharged from the end of the screen member 13a also passes into the bin 12d. When the gate 91 is shifted to the right position, the coarse aggregate which does not pass thru the screen 12b is permitted to pass over the gate and to be discharged into a chute 92 onto the ground or into a suitable receptacle. The chute 92 may be provided with a pivoted joint 93 so that the lower portion of the chute 92 may be directed into any position desired. This chute 92 normally takes the over-size aggregate from the screens when the gate is in the solid line position shown in Fig. 5.

To the left side of the plant is a vertical bucket conveyer 48 which is adapted to convey dust, such as lime dust and the like, from the lower end of the plant to the upper end thereof. The dust is discharged from the upper end of the conveyer 48 into a hopper 49 as shown best in Figs. 1 and 2. From the lower end of the hopper 49 extends a screw conveyer 50, said conveyer extending across the front side of the lower portion of the bin 12. At the right hand end of the screw conveyer 50 is positioned a chute or other suitable means 94 for directing the dust into the asphalt bucket 6. Intermediate the ends of the screw conveyer is an opening 50a which is normally closed by a gate 95 and which, when open, is adapted to discharge the dust conveyed therein into the weigh-box 5 by means of a chute 96. The gate 95 may be reciprocally mounted with respect to the under side of the tube of the screw conveyer and withdrawn from the opening by an arm 97 mounted at the forward side of the bin. To the pivotal portion of the arm 97 is shown connected another arm 98 which extends behind the chute 96 and to one side thereof. The free end of the arm 98 is connected by a suitable link to a control lever 99, as shown in Figs. 7 and 8. The control lever 99 may be arranged at the front side of the plant to one side of a battery of levers 17 controlling the discharges of the bins. The screw of the screw conveyer is operated independently by a motor 100 so that dust may be conveyed from the hopper 49 as desired and in the quantities desired. When the lever 99 is in its inward position, as shown in Figs. 7 and 8, the opening 50a of the screw conveyer is closed permitting the dust to be discharged into the asphalt bucket. If the lever 99 is withdrawn, the opening 50a is uncovered by-passing the dust into the weigh-box.

The various operative members of the plant as shown are driven by a shaft 41 which may be a motor shaft or which may be driven by a wheel mounted thereon and driven indirectly by a motor or other source of power. This shaft 41 is preferably positioned between the unit A and the dust conveyer 48 and mounted on the former. The mixer 4 may be driven by gearing directly from the shaft 41. This shaft drives, by a belt 43, a shaft 44 mounted on the frame of the upper unit and at the opposite side of the plant. By suitable belts or chains this shaft 44 drives the bucket conveyer 45 which extends from the ground to the upper end of the plant and supplies the aggregate to the screen, the screens 13 by suitable gears 46 and 47, as shown in Fig. 1, and, from the shaft upon which the gear 46 is mounted, by suitable means, the bucket conveyer 48 previously described.

It will be here noted that the frames of both the lower and upper paving plant units are made relatively narrow from front to rear, or in the direction in which the arch extends through the frame so that either the upper or lower unit may be mounted lengthwise, that is, transversely to the direction of the arch, upon a motor truck or flatcar, if desired, it being noted that such mounting of the lower unit is in addition to the convenience and facility of the mounting thereof on a motor truck described above.

Though I have shown a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a portable paving plant structure, a pair of separate cooperating paving plant units adapted to be superposed one above the other, the lower of said units having at its upper side a pair of horizontally spaced apart tracks, and the upper unit having at the middle portion of its opposite sides pairs of closely positioned wheels, each pair adapted to ride in one of said tracks, and an inclined runway extending from the ground to one end of the upper side of the lower unit, each pair of wheels forming together a substantially wide balancing pivot to facilitate the transfer from the runway to the tracks.

2. In a portable paving plant structure, a pair of separate cooperating paving plant units adapted to be superposed one above the other, the lower of said units having at its upper side a pair of horizontally spaced apart tracks, and the upper unit having at the middle portion of its opposite sides pairs of closely positioned wheels, each pair adapted to ride in one of said tracks, an inclined runway extending from the ground to one end of the upper side of the lower unit, and other wheels mounted on the upper unit at the opposite sides thereof in alignment with the first mentioned wheels at the respective sides of the upper unit and also positioned adjacent the opposite ends of the upper unit.

3. In a portable paving plant structure, a pair of separate cooperating paving plant units adapted to be superposed one above the other, the lower of said units having at the upper side a pair of horizontally spaced apart tracks, and the upper unit having at the middle portion of its opposite sides pairs of closely positioned wheels, each pair adapted to ride in one of said tracks, an inclined runway extending from the ground to one end of the upper side of the lower unit, and means extending over the upper side of the lower unit for drawing the upper unit up said inclined runway and for tilting said upper unit to a horizontal position about the pairs of wheels at the intersection of the planes of the inclined runways and the upper side of the lower unit.

4. A portable frame adapted to be transported by a flat truck, comprising a plurality of upright standards, and upper and lower horizontal beams connecting and supporting said standards relative to each other, the lower horizontal beams being supported on the truck for transporting the frame, said standards extending a considerable distance below the lower horizontal beams forming an arch at the lower side of the frame to permit a vehicle to pass therethrough under the upper portion of the frame, the length of the portions of the standards extending below the horizontal beams being less than the normal height of the horizontal beams above the ground, said frame, when transported, being adapted to be lowered on said truck and, when so lowered, to straddle the same.

5. In a paving plant of the class described, a relatively long multiple main bin having transverse partitions therein forming separate small bins positioned side by side, a long screen positioned above said main bin and lengthwise therewith, said screen being adapted to screen aggregate of various sizes and to discharge the sized aggregate into the separate small bins, the upper portion of the end bin at the discharge end of the screen having a gate pivotally mounted at its lower edge forming the upper portion of the outside wall of said small bin, and a discharge chute positioned at the outer side of said last mentioned small bin adapted to receive over-size aggregate from said screen, said gate being adapted to be positioned at an angle over the upper end of the last mentioned small bin for discharging the large and also the over-size aggregate into said chute, said gate being also adapted to be positioned over the upper end of the chute for directing over-sized aggregate into said last mentioned small bin.

6. In a paving plant of the class described, a plurality of bins positioned side by side in a row, a multiple screen positioned at an angle with the horizontal over the upper ends of said bins, said screen comprising a pair of aligned perforated cylinders of different mesh, the lower cylinder having mesh of greater size than the other cylinder, a third perforated cylinder positioned around one of the first mentioned perforated cylinders of smaller mesh and spaced from the lower end thereof, and a fourth perforated cylinder positioned around the other of the first mentioned perforated cylinders and spaced from the lower end thereof, the aggregate discharged into the screen being adapted to be sized and discharged progressively according to size from the third cylinder into the first bin, from one of the first mentioned cylinders of smaller mesh and from the lower end of the third cylinder into the second bin, from the fourth cylinder into the third bin, and from the first mentioned cylinder of larger mesh and from the lower end of the fourth cylinder into the fourth bin, the outer side of the upper portion of the fourth bin having a gate pivoted at its lower edge forming, when in a substantially upright position the outer wall for the fourth bin, said gate being adapted to be shifted over the upper portion of the fourth bin for directing the aggregate normally adapted to be discharged thereinto outside of the fourth bin, said gate being also adapted to be shifted outwardly for directing over-size aggregate, normally discharged from the lower end of the first mentioned cylinders of larger mesh, into the fourth bin.

7. In a means of the class described, a plurality of storage bins positioned side by side, multiple screening means for said bins adapted for screening aggregate of various sizes and discharge a different size aggregate into each bin, a chute at the side of the bin receiving the coarsest aggregate, said chute adapted to receive the aggregate not passing through the screen, and a pivoted plate adapted to extend between the chute and said bin and also to be placed at an angle over either the chute and said bin for diverting material into the other.

8. In a paving plant of the class described, a frame, an asphalt weigh-bucket mounted on said frame, a dust hopper mounted on said frame, a weigh-box mounted on the frame, a conveyer extending from the dust hopper toward said asphalt bucket, means connecting the end of the conveyer with said asphalt bucket, other means connecting said conveyer, intermediate the ends thereof, with said weigh-box, and a gate in connection with the last mentioned means for controlling the discharge of dust from said conveyer into the weigh-box, when said gate is opened, or for directing said dust into the asphalt bucket when the gate is closed.

9. The herein described method of transporting and erecting a paving plant frame comprising a plurality of upright standards and upper and lower horizontal beams connecting said standards, said standards extending below the lower horizontal beams a distance less than the normal height of the lower horizontal beams above the ground, forming an arch at the lower side of the frame, said method consisting in driving a conveying truck into the arch, lowering the frame onto the truck body with the lower portions of standards straddling the body and the lower ends thereof above the ground, then transporting the frame to the location desired, then removing the frame by raising the lower horizontal beams above the truck body, supporting the lower ends, and withdrawing the truck.

GEO. J. KUHRTS, Jr.